E. HORST.
SPRING WHEEL.
APPLICATION FILED AUG. 21, 1913.
1,125,688.
Patented Jan. 19, 1915.
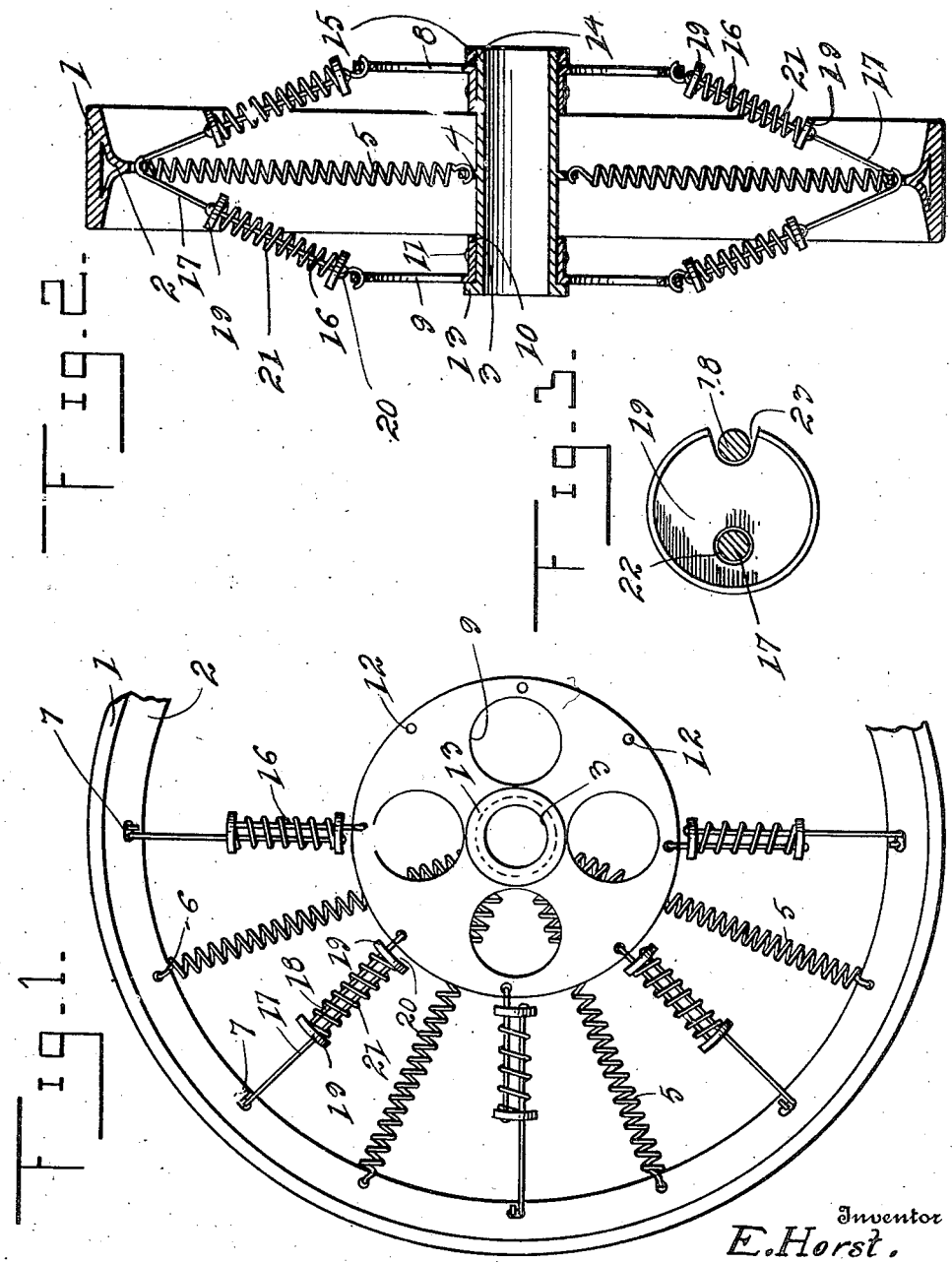
Witnesses
C. P. Bealle.
Inventor
E. Horst.
By Randolph Jr.
Attorney

UNITED STATES PATENT OFFICE.

ELAM HORST, OF CALVERTON, VIRGINIA.

SPRING-WHEEL.

1,125,688. Specification of Letters Patent. Patented Jan. 19, 1915.

Application filed August 21, 1913. Serial No. 786,013.

*To all whom it may concern:*

Be it known that I, ELAM HORST, a citizen of the United States, residing at Calverton, in the county of Fauquier and State of Virginia, have invented certain new and useful Improvements in Spring-Wheels; and I do hereby declare the following to be a full, clear, and exact description of the invention, such as will enable others skilled in the art to which it appertains to make and use the same.

My invention relates to spring wheels, and resides in the construction of a wheel that provides means for resiliently supporting its rim with respect to the hub so that in operation shock to the hub of the wheel is avoided.

An important object of my invention is to provide a wheel of the above mentioned character designed to support the rim portion of the wheel in such a manner that it may move radially with respect to the hub, thereby eliminating shock to the hub or gears upon the starting of the motor vehicle to which the wheel is attached.

A further important object of my invention is to provide a wheel of the above mentioned character constructed of few parts, simple and reliable in its operation, and cheap to manufacture.

The above and additional objects are accomplished by such means as are illustrated in the accompanying drawings, described in the following specification and then more particularly pointed out in the claim which is appended hereto and forms part of this application.

With reference to the drawings, wherein I have illustrated the preferred embodiment of my invention as it is reduced to practice, and throughout the several views of which similar reference numerals designate corresponding parts: Figure 1 is a side elevation of my device in assembled position showing the rim of the wheel broken away, Fig. 2 is a vertical sectional view taken centrally through the hub and illustrating the springs operably connecting and supporting the rim with relation to the hub, and Fig. 3 is a detail view of the washer used in connection with the supporting rods of my device.

Referring now to the drawings, the numeral 1 designates as an entirety the rim of the wheel, which is formed of suitable metal and is provided upon its inner surface and centrally with an inwardly extending annular flange 2 formed integrally with the rim. A cylindrical hub 3 is provided centrally with a plurality of radially extending apertured lugs 4, which are formed integrally with the hub in spaced relation with each other. As a means for resiliently supporting the rim with relation to the hub, this invention employs a plurality of helical springs 5, which are secured terminally within openings 6 formed in the flange 2 and within the apertured lugs 4. The helical springs 5 are arranged so that the outer terminals of each of the springs engage every other one of the openings in the flange 2, leaving spaces therebetween in which are formed oblong openings 7.

A pair of apertured plates 8 and 9 are secured to the terminals of the hub 3 by means of inwardly extending annular flanges 10 formed upon each of the plates, engaging the hubs and secured thereto by means of bolts 11, or suitable fastening means which extend through the flanges 10 and engage the hub. Each of the plates 8 and 9 are provided with a plurality of spaced openings 12 adjacent their outer edges. The hub 3 is also provided at one terminal with a radially extending annular flange 13, which is adapted to engage the outer face of the plate 9. The other terminal of the hub 3 is screw threaded as at 14, and adapted to receive an internally screw threaded ring or washer 15, which engages the outer face of the plate 9 when the device is in an assembled position. It is thus apparent that by the herein described arrangement facilitation for the assembling of the device is had. A pair of diametrically oppositely disposed bracing elements 16 are also employed in connection with the helical springs 5 and assist in supporting the rim with relation to the hub. Each of the bracing elements consists of a pair of rods 17 and 18, which are secured at certain of their terminals within the openings 7 in the flange 2, and openings 12 in the plates 8 and 9. A pair of washers 19 are loosely mounted upon the rods 17 and 18 and engage the head 20 on each of the rods. A helical spring 21 is mounted upon the rods and engages at its terminals the washers 19. The washers 19 are provided with an opening 22 adjacent one side thereof through which the rods are adapted to be inserted to facilitate the mounting of the washers. Outwardly opening semi-circular notches 23 are also formed in the washers 19 opposite the opening 22, and are adapted to receive one of the rods to each pair of a bracing element.

The hub 3 is of greater length than the width of the rim 1 and the plates 8 and 9 mounted thereon are disposed outwardly with respect to the side edges of the rim, and it will thus be seen that the lower terminals of the bracing elements 16 are disposed in divergent relation with respect to the vertical axis of the wheel or hub, whereby the supporting area of the hub is materially increased, and that very little lateral movement of the rim is encountered when a curve is turned, as the bracing elements 16 prevent such movement; but that radial movement of the rim is provided and that undue wear of the hub or gears of the motor vehicle is prevented.

The purpose of the apertures within the plates 8 and 9 is to allow for access to the inner central portion of the hub about which mud or dirt is apt to collect, in order that the dirt or mud may be removed.

It is apparent that when the motor vehicle to which the wheel of my improved construction is attached, is started, that the wheel is allowed radial movement with respect to the hub, thereby preventing undue wear on the gears in the vehicle and the hub caused by the shock which takes place in wheels of the type now in use.

In reduction to practice, I have found that the form of my invention, illustrated in the drawing and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim is:

A spring wheel comprising an outer rim, an inwardly extending flange formed integrally and centrally with said rim and provided with a plurality of spaced openings formed therein, a cylindrical hub of greater length than the width of said rim, annular plates centrally apertured mounted vertically upon the ends of said hub, inwardly extending annular flanges on the plates surrounding and secured to the hub, an annular flange formed on one end of the hub, an externally threaded ring formed on the other end of the hub, said last named annular flange and the hub engaging the outer faces of the plate, radially disposed rods secured to said plates, rods connected in the apertures in said flange, said last mentioned rods being disposed in parallel relation to the first mentioned rods, washers connected to the ends of said rods, springs surrounding said rods and bearing at their ends upon said washers, and a second set of springs secured centrally to said hub and connected to the flange of said rim at points intermediate the rods.

In testimony whereof I affix my signature in presence of two witnesses.

ELAM HORST.

Witnesses:
M. H. CURTIS,
O. A. THOMAS.